(12) United States Patent
Lin

(10) Patent No.: US 6,292,348 B1
(45) Date of Patent: Sep. 18, 2001

(54) SURFACE MOUNTED CAPACITOR

(76) Inventor: Chieh-Fu Lin, No. 53, Yung Feng Road Sec. 1, Yung Chuen Tsun, Li Kang Hsiang, Pingtung Hsien (TW)

(*) Notice: Subject to any disclaimer, the term of this patent is extended or adjusted under 35 U.S.C. 154(b) by 17 days.

(21) Appl. No.: 09/642,789

(22) Filed: Aug. 22, 2000

(51) Int. Cl.⁷ ...................................................... H01G 4/00
(52) U.S. Cl. ..................................... 361/301.3; 361/301.3; 361/272; 361/334; 361/275
(58) Field of Search ................................. 361/301.3, 535, 361/539, 517, 519, 520, 158, 334, 272–275

(56) References Cited

U.S. PATENT DOCUMENTS 4,673,900 * 6/1987 Blamire et al. ...................... 333/167
4,812,941 * 3/1989 Rice et al. .............................. 361/15
5,683,834 * 11/1997 Fujimoto et al. ..................... 429/218

* cited by examiner

Primary Examiner—Dean A. Reichard
Assistant Examiner—Nguyen T Ha
(74) Attorney, Agent, or Firm—Bacon & Thomas, PLLC

(57) ABSTRACT

A surface mounted capacitor comprises a casing, an inner board, a dielectric medium, aid an outer board. The inner board and the dielectric medium are mounted in the casing with two leads of the dielectric medium extended out of the casing. Resin glue and electrolyte are filled into a compartment defined in the casing and the outer board is mounted to seal an opening of the casing. The leads are bent and then positioned in grooves defined in the casing.

5 Claims, 6 Drawing Sheets

SURFACE MOUNTED CAPACITOR

BACKGROUND OF THE INVENTION

1. Field of the Invention

The present invention relates to a surface mounted capacitor, and more particularly to a surface mounted capacitor that is automatically manufactured by a surface mounting technique.

2. Description of the Related Art

Taiwan Utility Model Publication No. 266300 issued on Dec. 03, 1995 and entitled "SURFACE INSERT TYPE CHIP CAPACITOR", as shown in FIG. 1 of the drawings, discloses a surface mounted capacitor comprising a casing 10, a dielectric medium 20, a layer of rubber 30, and a support base 40. The casing 10 is made of metal and covered by an insulating film. The dielectric medium 20 includes a charged layer 21, an insulating layer 22, and two leads 23. The dielectric medium 20 is mounted inside the casing 10 and rubber 30 is provided to seal the dielectric medium 20 inside the casing 10 after filling of electrolyte. The casing 10 is rolled at a portion thereof so as to be stuck into the rubber 30 to form an annular groove 11 for preventing the rubber 30 from moving out of the casing 10. The support base 40 is mounted to an opening of the casing 10 with the leads 23 extended through the rubber 30 and then rested on an outer surface of the support base 40 after bending. Nevertheless, the casing 10 is made of metal such that the length of the insulating layer 22 must be longer than that of the charged layer 21 so as to avoid short circuit resulting from contact between the charged layer 21 of the dielectric medium 20 and the casing 10. In addition, the support base 40 is necessary for fixing the leads 23, which increases the overall length and volume of the capacitor. Further, the capacitance of the dielectric medium will be conducted outside and thus cannot be stored if the insulating film on the outer surface of the casing 10 is damaged. The good production rate for the capacitors is thus lowered. Further, the electrolyte in the casing 10 is kept inside the casing 10 by means of sealing between the annular groove and the rubber 30. Leaking of the electrolyte is likely to occur due to improper rolling or fatigue of the rubber. The good production rate is thus poor.

FIGS. 2 and 3 illustrate another conventional surface mounted capacitor that includes a casing 50, a dielectric medium 60, a layer of glue 70, and a cover 80. The casing 50 includes a lateral side 51, a first end face 52, and a second end face 53. The second end face 53 includes an opening 54. The dielectric medium 60 is firstly mounted into the casing 50 and a stop plate 55 is then provided to enclose the dielectric medium 60. The glue 70 is applied to the first end face 52 and fills the casing 50 in a manner shown in FIG. 3. Two leads 61 of the dielectric medium 60 extend out of the stop plate 55 and the glue 70 and then rest on the lateral surface 51 of the casing 50 after bending along the first end face 52. The electrolyte is filled into the casing 50 via the opening 54, and the cover 80 is then provided to seal the casing 50. Alternatively, the material around the opening 54 may be heated and thus seal the opening 54 by means of using a high-temperature die.

Nevertheless, during filling of the glue, a recessed area is formed in the first end face 52 of the casing 50 after hardening of the glue 70 due to surface tension. As a result, the portions of the leads 61 along the first end face 52 are not planar and thus not suitable to surface mounting technique (SMT). Further, a protruded section is formed on the second end face 53 of the casing 50 after mounting of the cover 80 or sealing by means of fusion. This is not suitable to a suction/holding mechanism used in SMT. As a result, the capacitor is only useable in the portion of the leads 61 along the lateral side 51 of the casing 50, and the suction/holding mechanism used in SMT can only hold the planar portion along the lateral side 51 of the casing 50. Application of the capacitor is thus limited.

SUMMARY OF THE INVENTION

The casing of the capacitor is made of insulating material such that the insulating layer of the dielectric medium needs not to be lengthened to thereby avoid short circuit resulting from contact between the charged layer and the casing. The overall volume is thus reduced. In addition, each face of the casing of the capacitor is planar such that a suction/holding mechanism can be used to hold the casing by means of sucking, thereby allowing wider application of the capacitor.

It is, therefore, the primary object of the present invention to provide a surface mounted capacitor with a simpler structure and made from insulating material. The number of elements is reduced to thereby reduce the overall volume for achieving the purpose of reducing the overall height.

It is another object of the present invention to provide a surface mounted capacitor with a simpler structure, wherein the casing of the capacitor has a larger opening to allow rapid, accurate filling of electrolyte into the casing. The assembly procedure is thus simpler and quicker and the good production rate is improved.

It is a further object of the present invention to provide a surface mounted capacitor having a casing with a completely flat face to be sucked and thus held by a suction/holding mechanism used in SMT, such that the capacitor in accordance with the present invention can be used in various processes of SMT.

A capacitor in accordance with the present invention comprises a casing, an inner board, a dielectric medium, and an outer board. The casing includes a peripheral wall and an end face to thereby define a compartment with an opening. The end face includes two grooves each having a through-hole through which an associated one of two legs of the dielectric medium extends. The peripheral wall includes a through-hole communicated with the compartment. An inner periphery defining the compartment includes a peripheral flange for positioning the inner board. In assembly of the capacitor, the inner board and the dielectric medium are placed into the compartment of the casing, respectively, with the two leads of the electric medium extended beyond the end face of the casing via holes of the inner board. Resin glue is poured into the compartment via the through-hole. The resin glue fills the compartment and is between the inner board and the end face. Electrolyte is filled into the compartment via the opening of the casing and the outer board is used to cover the opening. The leads are then provided with electricity to age (charge) the dielectric medium and to proceed with tests. Then, the leads are bent to be located in the grooves in the end face, respectively. A suction/holding mechanism of surface mounting technique (SMT) can be used to hold a portion of the outer board by suction for mounting the capacitor to an apparatus.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 1:
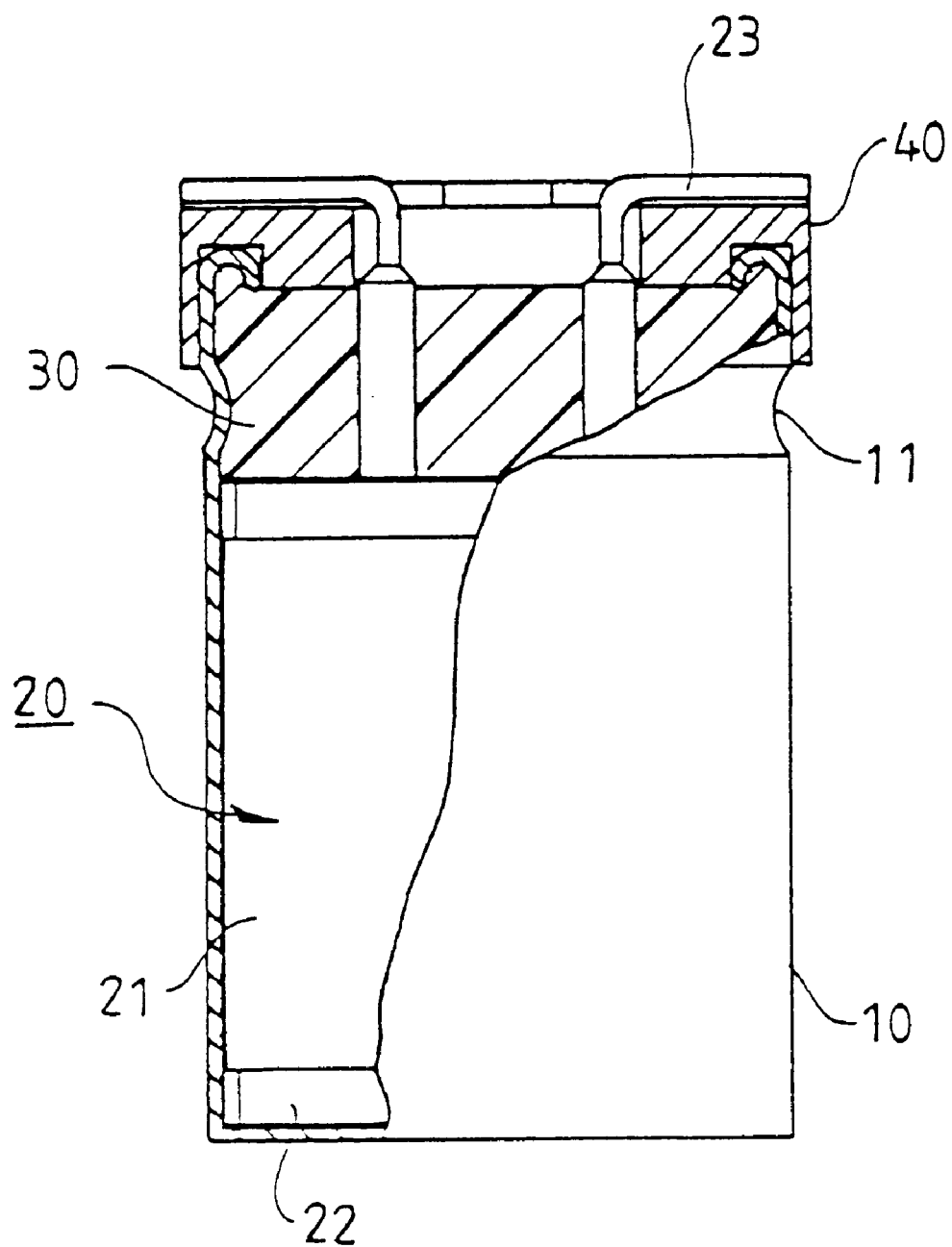
FIG. 1 is a side view, partly sectioned, of a conventional surface mounted capacitor.
Figure 2:
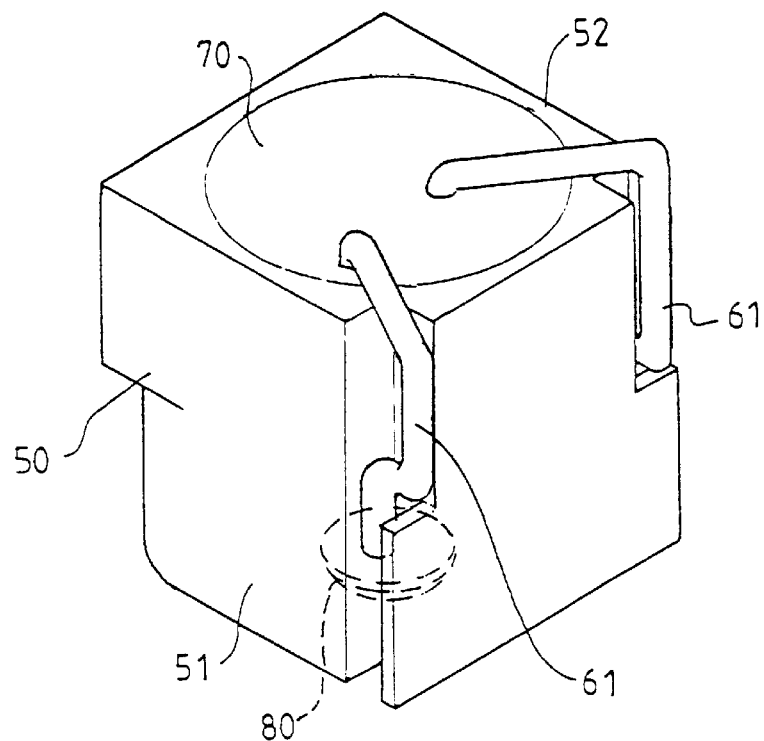
FIG. 2 is a perspective view of another conventional surface mounted capacitor.
Figure 3:
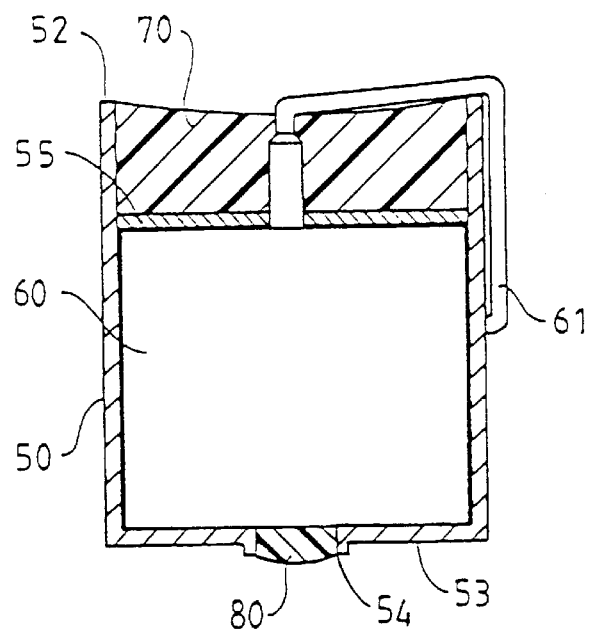
FIG. 3 is a sectional view of the conventional surface mounted capacitor in FIG. 2.
Figure 4:
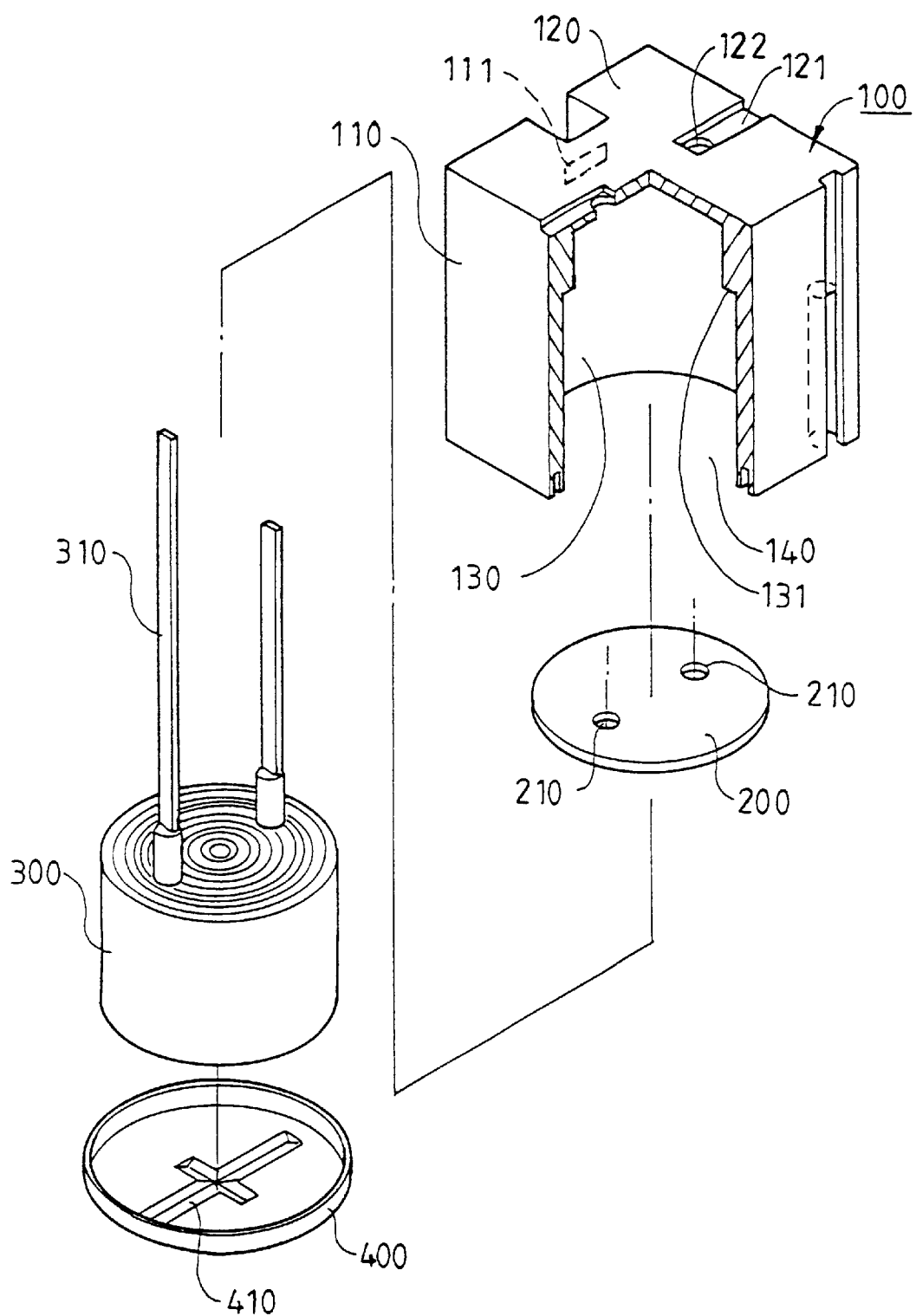
FIG. 4 is an exploded perspective view, partly cutaway, of a first embodiment of a surface mounted capacitor in accordance with the present invention.

FIG. 4 illustrates a first embodiment of a surface mounted capacitor in accordance with the present invention that generally includes a casing 100, an inner board 200, a dielectric medium 300, and an outer board 400. The casing 100 includes a peripheral wall 110 and an end face 120 that together define a compartment 130 with an opening 140. The end face 120 includes two first grooves 121 each having a through-hole 122 through which an associated leg 310 of the dielectric medium 300 extends. The casing 100 is preferably made of plastic material or other suitable insulating material. The peripheral wall 110 includes a through-hole 111 communicated with the compartment 130. An inner periphery defining the compartment 131 includes a peripheral flange 131 for positioning the inner board 200. The outer board 400 covers the opening 140 of the casing 100.

Figure 5:
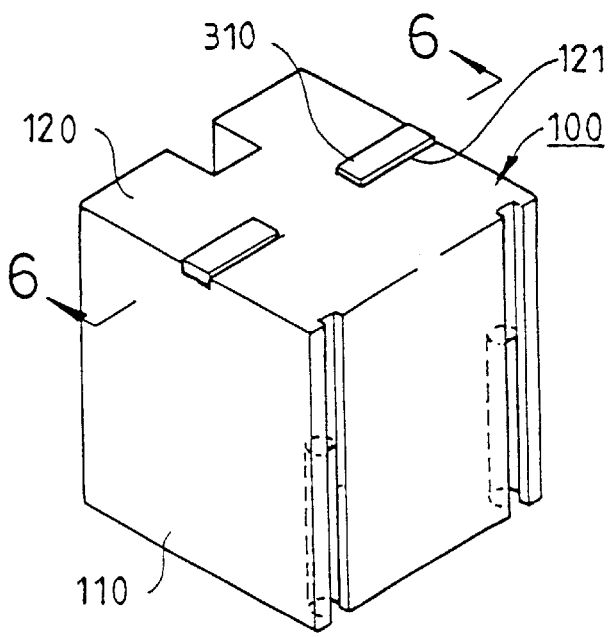
FIG. 5 is a perspective view of the surface mounted capacitor in FIG. 4.
Figure 6:
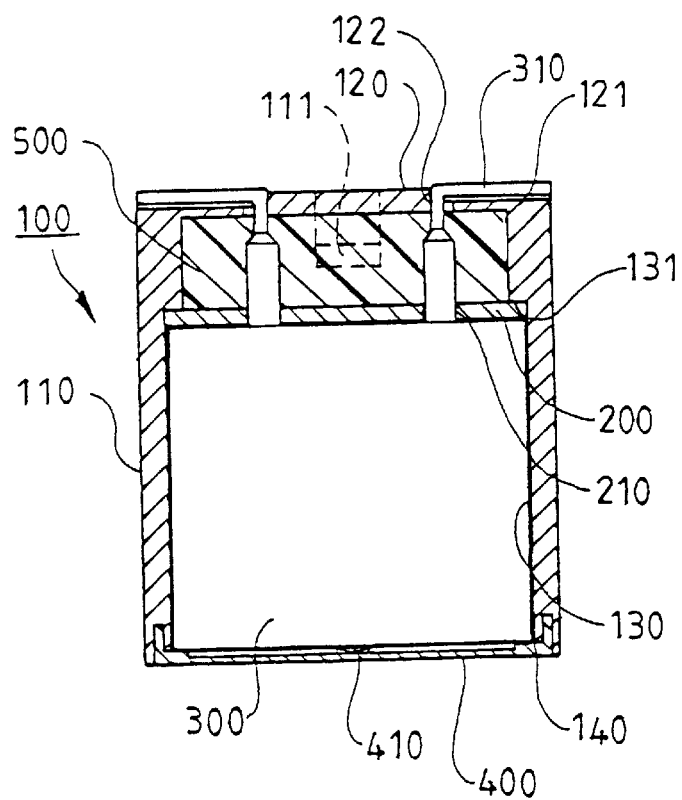
FIG. 6 is a sectional view taken along line 6—6 in FIG. 5.
Figure 7:
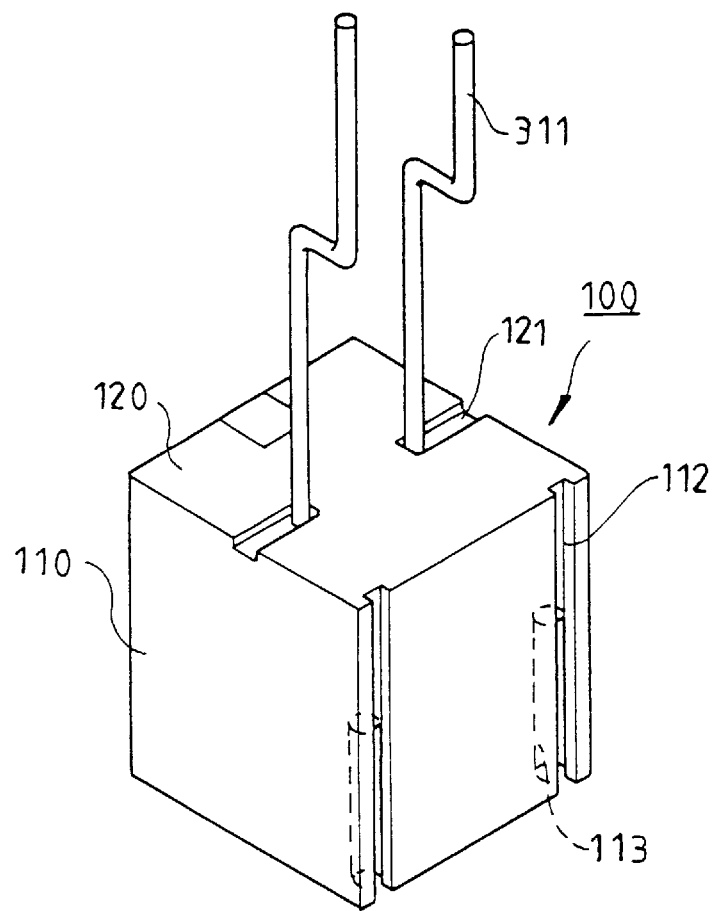
FIG. 7 is a perspective view of a second embodiment of the surface mounted capacitor in accordance with the present invention.
Figure 8:
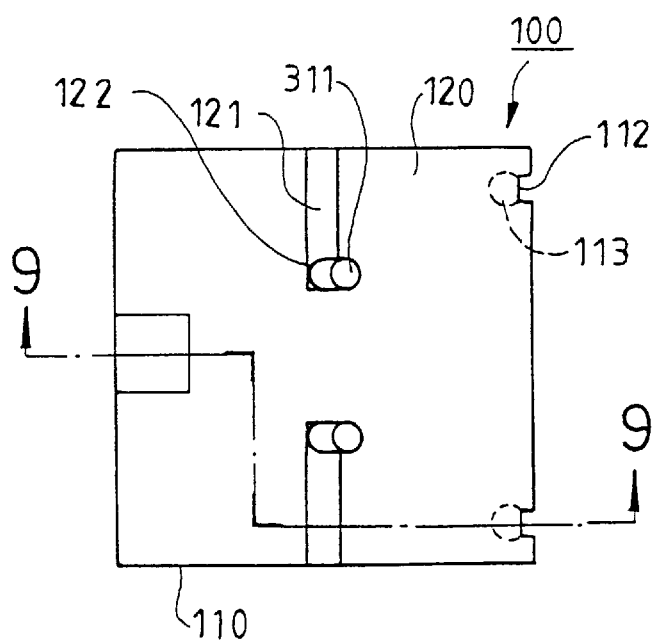
FIG. 8 is a top view of the surface mounted capacitor in FIG. 7, wherein the leads of the capacitor have not been bent, yet.
Figure 10:
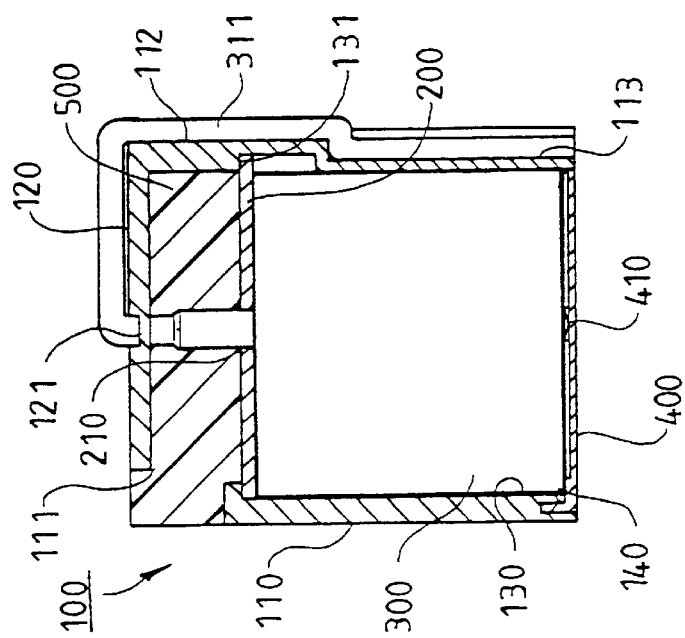
FIG. 10 is a sectional view similar to FIG. 9, wherein the leads have been bent.
Figure 9:
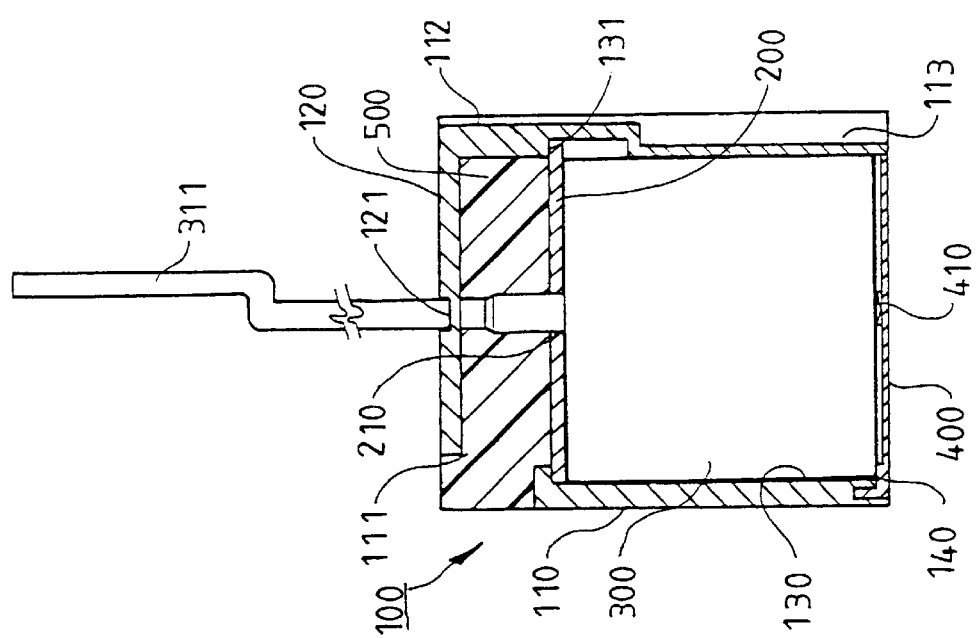
FIG. 9 is a sectional view taken along line 9—9 in FIG. 8.

Referring to FIGS. 4, 5, and 6, in assembly of the capacitor, the inner board 200 and the dielectric medium 300 are respectively mounted into the compartment 130 of the casing 100. The inner board 200 separates the compartment 130 into two subcompartments, wherein a first subcompartment (not labeled) is defined between the end face 120 of the casing 100 and the inner board and a second subcompartment (not labeled) is defined between the inner board 200 and the opening 140 of the casing 100. The dielectric medium 300 is mounted into the second subcompartment with the two leads 310 of the electric medium 310 extended beyond the end face 120 of the casing 100 via holes 210 of the inner board 200. If desired, the leads 310 are flattened as shown in the figures to allow easy bending of the leads 310 to form a right angle and to provide straight, planar surfaces after bending. Namely, the leads 310 are bent to lie flat against the end face 120. Resin glue 500 is poured into the compartment 130 via the through-hole 111. The resin glue 500 fills the compartment 130 and is between the inner board 200 and the end face 120 while maintaining the electric medium 300 inside the casing 100. Electrolyte is filled into the compartment 130 via the opening 140 of the casing 100 and the outer board 400 is used to cover the opening 140. The outer board 400 is preferably bonded by means of supersonic wave welding or fusion. In addition, the outer board 400 includes a plurality of pre-determined breaking lines 410 to release pressure resulting from accidental explosion of the capacitor. The capacitor is sealed at this time. The leads 310 are then provided with electricity to age (charge) the dielectric medium 300. Tests may be proceeded at the same time if necessary. Then, the leads 310 are bent to be located in the first grooves 121 in the end face 120, respectively. In this embodiment, a suction/holding mechanism of surface mounting technique (SMT) can be used to hold a portion of the outer board 400 by suction for mounting the leads 310 on the end face 120 of the capacitor to an apparatus.

FIGS. 7–10 illustrate a second embodiment of the surface mounted capacitor in accordance with the present invention. The second embodiment differs from the first embodiment by that each lead 310 of the dielectric medium 300 is bent to form a fixing end 311. A wall face of the peripheral wall 110 of the casing 100 includes two second grooves 112 each defining a positioning recess 113. The positioning recess 113 has a width slightly smaller than a diameter of the fixing end 311 of an associated lead 310. More specifically, the leads 310 are extended through the through-holes 122 of the casing 100 and then bent to be positioned in the second grooves 112 in the peripheral wall 110 of the casing 100 with the fixing ends 311 positioned in the positioning recesses 113, respectively. In this embodiment, a suction/holding mechanism of surface mounting technique (SMT) can be used to hold a portion of another wall face of the peripheral wall 110 that faces away from the leads 310 by suction for mounting the leads 310 of the capacitor to an apparatus.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A surface mounted capacitor comprising:

a casing comprising a peripheral wall and an end face that together define a compartment with an opening, an inner periphery defining the compartment comprising a peripheral flange, the end face comprising two end holes formed therein; the peripheral wall comprising a wall hole formed therein;

an inner board having two holes formed therein, the inner board being mounted in the casing and positioned by the peripheral flange for separating the casing into a first subcompartment between the end face of the casing and the inner board and a second subcompartment between the inner board and the opening of the casing, the first subcompartment being filled with a resin glue;

a dielectric medium comprising two leads, the dielectric medium being mounted in the second subcompartment with the two leads respectively extended through the two holes of the inner board and the two end holes of the casing and bent to lie flat against the end face; and an outer board for covering the opening of the casing, the inner board and the outer board having an electrolyte filled therebetween.

2. The surface mounted capacitor as claimed in claim 1, wherein the outer board includes a plurality of pre-determined breaking lines to release pressure resulting from accidental explosion of the capacitor.

3. The surface mounted capacitor as claimed in claim 1, wherein the outer board is bonded to the casing by supersonic welding for covering the opening of the casing.

4. The surface mounted capacitor as claimed in claim 1, wherein the end face of the casing includes two first grooves for positioning the leads after bending of the leads.

5. The surface mounted capacitor as claimed in claim 1, wherein each said lead includes a fixing end, and wherein the peripheral wall includes a wall face having two second grooves each having a positioning recess, each said lead being received in an associated said second groove with the fixing end positioned in an associated said positioning recess.

* * * * *